US006253885B1

United States Patent
Tsai et al.

(10) Patent No.: US 6,253,885 B1
(45) Date of Patent: Jul. 3, 2001

(54) EDDY CURRENT BRAKE FOR AUTOMOTIVE VEHICLES

(75) Inventors: Hong Tsai, Farmington Hills; Youqing Xiang, Canton, both of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/433,823

(22) Filed: Nov. 3, 1999

(51) Int. Cl.$^7$ ........................................... B60L 7/00
(52) U.S. Cl. ................................................. 188/158
(58) Field of Search ............................ 188/158, 161, 188/164

(56) References Cited

U.S. PATENT DOCUMENTS

| 2,679,015 | 5/1954 | Carter . | |
|---|---|---|---|
| 3,235,758 | 2/1966 | Dinsmore . | |
| 4,491,753 | * 1/1985 | Kumatani | 310/77 |
| 5,303,802 | 4/1994 | Kuwahara . | |
| 6,148,967 | * 11/2000 | Huynh | 188/164 |

FOREIGN PATENT DOCUMENTS

| 560157 | * 9/1923 | (FR) | 188/164 |
|---|---|---|---|
| 686759 | * 3/1965 | (IT) | 188/164 |
| 07154958 | * 6/1995 | (JP) | 188/164 |

OTHER PUBLICATIONS

"Analysis of an Electromagnetic Brake", by J. Bigeon et al, Electric Machines and Power Systems, 10:286–297, 1985.
"Design of Permanent Magnet Type Compact ECB Retarder", by Harou Sakamoto et al, SAE Technical Paper No. 973228, pp. 19–25, Nov. 17–19, 1997.

* cited by examiner

Primary Examiner—Robert J. Oberleitner
Assistant Examiner—Xuan Lan Nguyen
(74) Attorney, Agent, or Firm—Larry I. Shelton

(57) ABSTRACT

An eddy current brake having an electromagnetic pole and a rotor journalled for rotation in a torque delivery shaft of an automotive vehicle driveline, the rotor being rotatably positioned in close proximity to the stator with an air gap between them. The stator comprises steel pole pieces with hollow cores that establish a magnetic circuit for a magnetic flux field. The pole pieces have machine-wound electrical windings. The windings are fastened with pole caps. The hollow core reduces the weight and material of the stator without significantly adversely affecting the braking capacity of the retarder brake for any given speed of rotation of the rotor and for any given number of ampere-turns for the stator windings. The pole caps reduce the magnetic saturation and increases the overall brake torque output.

10 Claims, 8 Drawing Sheets

EDDY CURRENT BRAKE FOR AUTOMOTIVE VEHICLES

FIELD OF THE INVENTION

The invention comprises an electromagnetic brake for complementing the braking action of friction wheel brakes of an automotive vehicle.

BACKGROUND ART

It is known design practice to complement the braking action of friction wheel brakes of an automotive vehicle by using eddy current retarders. These convert the kinetic energy of the vehicle into electrical energy in the form of eddy currents. The electrical energy is dissipated in the form of heat.

Such eddy current brakes include a stator comprising either a permanent magnet or an electromagnet to create a magnetic flux field. The stator is stationary and a rotor is connected drivably to a torque delivery element, such as the drive shaft for automotive vehicle traction wheels.

In the case of an electromagnetic stator, the stator poles have electromagnetic windings that are excited with a voltage created by an onboard electrical power source, such as a vehicle battery alternator system.

An example of an eddy current brake with a permanent magnet stator has been described by H. Sakamoto et al in a publication entitled "Design of Permanent Magnet Type Compact ECB Retarder", SAE Technical Paper 973228, dated Nov. 17–19, 1997. An electromagnetic eddy current retarder is described by J. Bigeon et al in a paper entitled "Analysis of an Electromagnetic Brake", published in a journal entitled Electric Machines And Power Systems, 10:285–297, 1985.

Permanent magnet eddy current brakes have stator poles that are solid and, of necessity, are formed of magnetic materials with rare earth ingredients such as Neodymium Ferrous Boron (NdFeB). Such materials are both costly and difficult to maintain and handle due to their corrosion characteristics. Although an electromagnetic eddy current brake is less costly because of the lack of expensive materials, such as Neodymium Ferrous Boron, they too typically are of substantial weight because of the solid design of the stator.

Both permanent magnet eddy current brakes and electromagnetic eddy current brakes comprise a drive shaft and a rotor drum that rotate together in a magnetic field established by the stator windings. The braking force generated at the rotor is created by interaction of rotor eddy currents and the stator magnetic field. The eddy currents are formed principally at or near the outer surface of the rotor drum, depending on the speed of rotor rotation.

The kinetic energy involved in this braking action generates heat. Cooling fins usually are added to the outer surface of the rotor drum to dissipate the heat produced by the eddy currents.

Aside from the weight and cost disadvantages of presently known eddy current brakes, the design of known brakes requires complex assembly procedures because of the number of parts involved in the assembly. These parts include seals and steel closure plates that separate the eddy current brake from harsh environments to prevent rust and corrosion.

SUMMARY OF THE INVENTION

An objective of the invention is to provide a stator for an eddy current brake that is electrically energized and is of reduced weight. A further object of the invention is to provide a stator for an eddy current brake that is adaptable for commercial manufacturing and assembly operations with reduced cost.

The eddy current brake of the invention includes a steel stator with magnetic poles that are energized by electric windings to create the necessary flux field. A rotor in the form of a steel rotor drum is mounted within the stator poles so that a small air gap exists between the pole faces of the stator and the periphery of the rotor drum.

The poles are cast or otherwise formed as an integral part of the overall stator assembly using high permeability steel. The geometry of the poles can be strategically controlled to reduce substantially the mass of the stator while maintaining optimum braking torque specifications for a particular design. In this way, there is minimal degradation of output braking torque while total stator weight is minimized. Further, the height of the field poles can be designed to provide an optimum air gap to maintain the required flux density.

The design characteristics of the stator make it possible to reduce the field pole weight by about 40 to 50 percent compared to prior art stators for an eddy current brake of this kind.

The stator of the invention requires electric current excitation. This is provided by multi-turn copper windings, which are shaped so that they can be prefabricated and assembled over the pole pieces with a simple assembly procedure. The coils can be automatically wound on a nonferrous bobbin using a standard winding machine and assembled to the pole piece with automated equipment.

In order to increase the braking efficiency of the eddy current brake of the invention, the design includes magnetic field pole caps, which retain the stator field windings in place following assembly. The caps are designed to reduce field pole magnetic saturation as the rotor rotates at high speed relative to the stator. This is done as the caps increases the effective pole face area. The pole caps can be attached to the face of the stator poles using simple fastener devices, such as through bolts.

The eddy current brake of the invention can be mounted in the driveline with simple brackets that connect the stator to the housing of a vehicle differential and axle assembly for an automotive vehicle.

The rotor for the eddy current brake of the invention is fixed to a drive shaft in the vehicle driveline by a flange and supporting arms. This design allows for a convenient mounting procedure for the rotor and the axle drive shaft. Alignment and concentricity of the rotor is established by properly locating the holes for mounting bolts that secure the rotor to the driveline axle housing.

A protective shield is used to protect the stator windings from exposure to dirt and road debris and other harsh elements in the environment. The shield is made of steel so that it can provide additional braking torque by containing leakage of flux produced by the stator windings.

The stator design has strategically placed cavities or hollow portions at the cores of the field poles. This significantly reduces the weight of the stator without adversely affecting the overall braking capacity. Further, the hollow field pole design of the invention reduces the self-inductance of the field windings because of the reduced mass of the field poles.

The permeability of the stator is reduced because of the cavities or hollow portions of the stator. It thus is possible to achieve a faster system response to a driver command for braking. The reduction in permeability of the material of the poles can be expressed as a change in inductance per unit length of the pole (e.g., Henrys per cm).

The increase in the effective pole areas created by the caps on the stator poles reduces the tendency of the flux field to be concentrated in a dense fashion at the end faces of the poles. In this way, the caps improve the braking efficiency.

BRIEF DESCRIPTION OF THE FIGURES OF THE DRAWINGS

FIG. 12c is a detail of the fins on the drum surface of the rotor as seen from the plane of section line 12c—12c FIG. 12a;

BEST MODE FOR CARRYING OUT THE INVENTION

Figure 1:
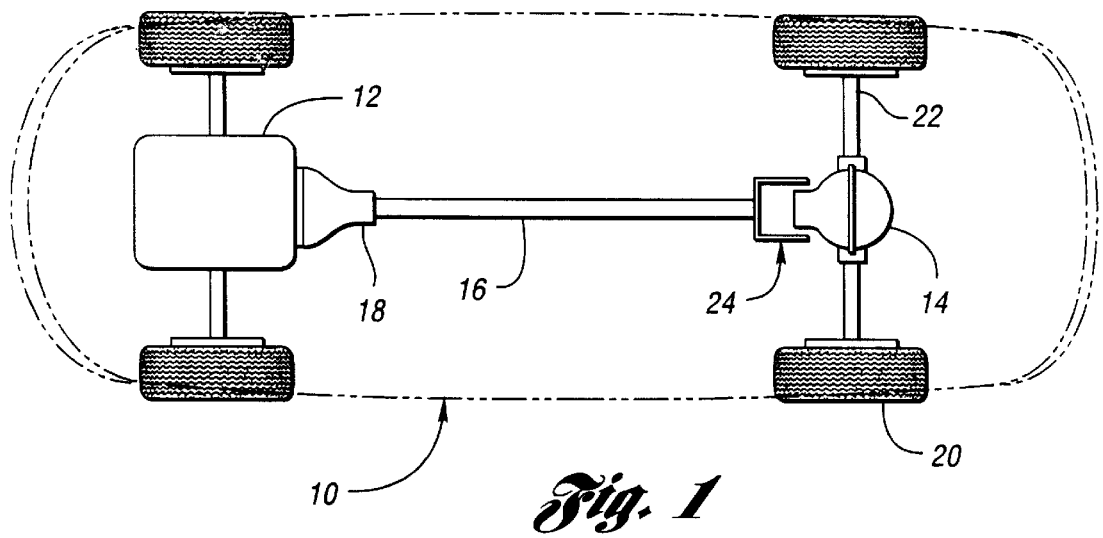
FIG. 1 is a schematic representation of an automotive vehicle driveline, which indicates the location of the eddy current brake of the invention.

In FIG. 1, the engine for a vehicle 10 is shown at 12. The differential and axle assembly for the driveline for the vehicle 10 is shown at 14. Numeral 16 designates the vehicle drive shaft for transferring torque from the vehicle transmission 18. The torque input side of the transmission receives driving torque from the engine 10. The output torque of the differential and axle assembly drives traction wheels 20 through axle shafts 22. The electromagnetic retarder of the invention is schematically illustrated in FIG. 1 at 24.

Figure 2:
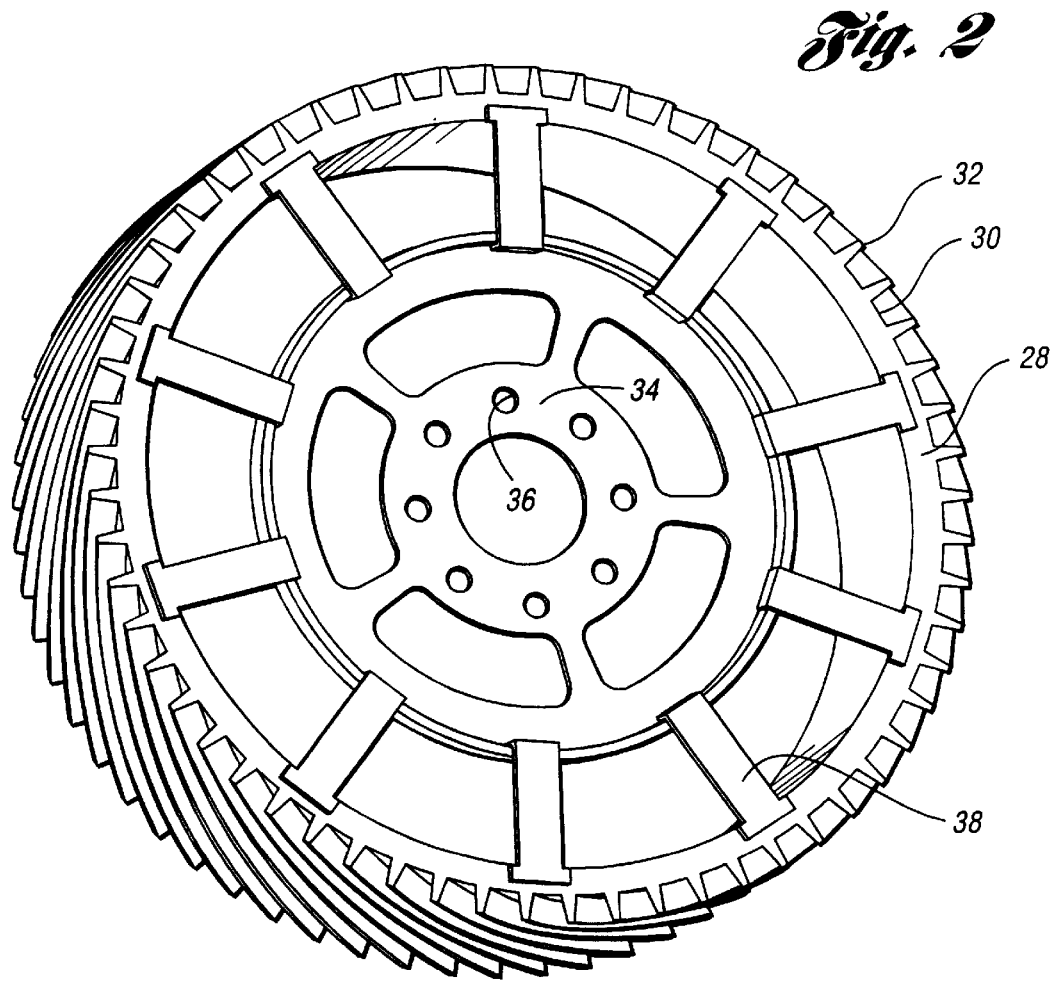
FIG. 2 is an isometric view of the retarder rotor used in the eddy current brake of the invention, but with the steel shield removed.

FIG. 2 is an isometric view of a rotor of the retarder of the invention, which comprises a rotor drum 28 having an outer periphery 30 that carries cooling fins 32. Preferably, the fins 32 are spiraled to facilitate air flow across the drum in the direction of the axis of rotation of the rotor.

The rotor includes a central mounting plate 34, which is provided with mounting bolt holes 36 to establish a bolted connection with an annular flange on the drive shaft 16. Radial mounting arms 38 secure the mounting plate 34 to the rotor drum 28.

Figure 12:
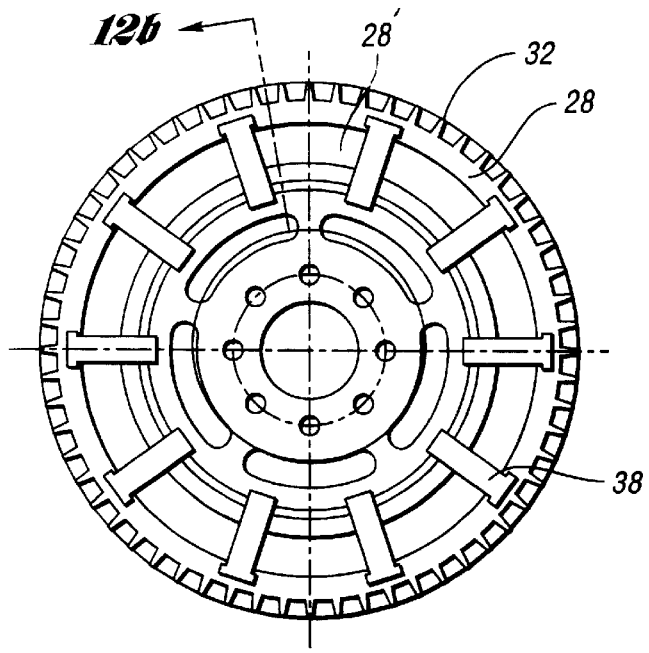
FIG. 12 is a view of the rotor and stator assembly together with a mounting flange for securing the stator to the differential and axle housing of the driveline.
Figure 12A:
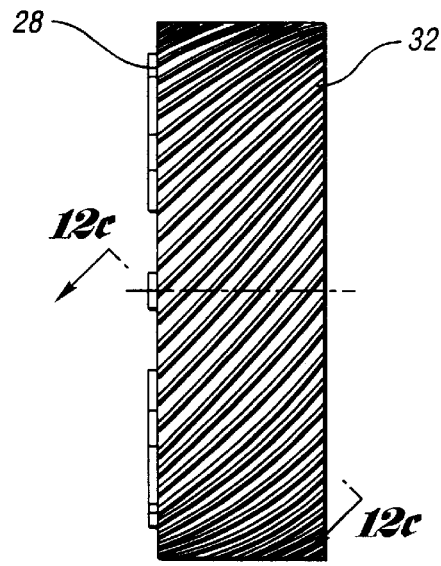
FIG. 12a is a side view of the assembly of FIG. 12.
Figure 12B:
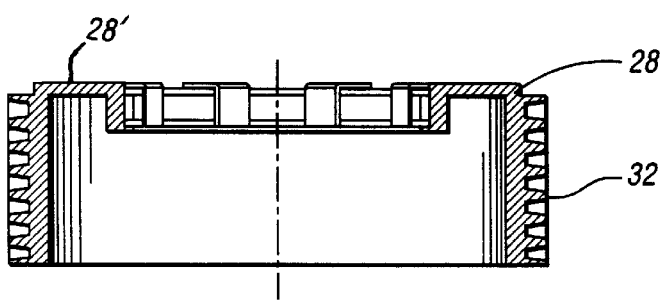
FIG. 12b is a cross-sectional view of the rotor seen in FIG. 12 taken along the plane of section line 12b—12b of FIG. 12.
Figure 12C:
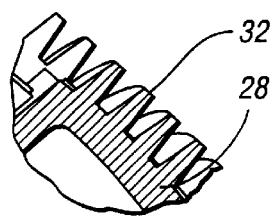

The rotor also includes a steel shield in the form of a flat, annular ring 28', seen in FIGS. 12 and 12a, secured to the rotor at the inside diameter of the rotor. The shield 28' is not shown in FIGS. 2 and 4 because it would obscure the view of the electrical field windings 44. It is a purpose of the shield to protect the windings from road debris. Further, because the shield is made of steel, it will capture stray leakage of electromagnetic flux from the windings at the end of the stator.

Figure 3:
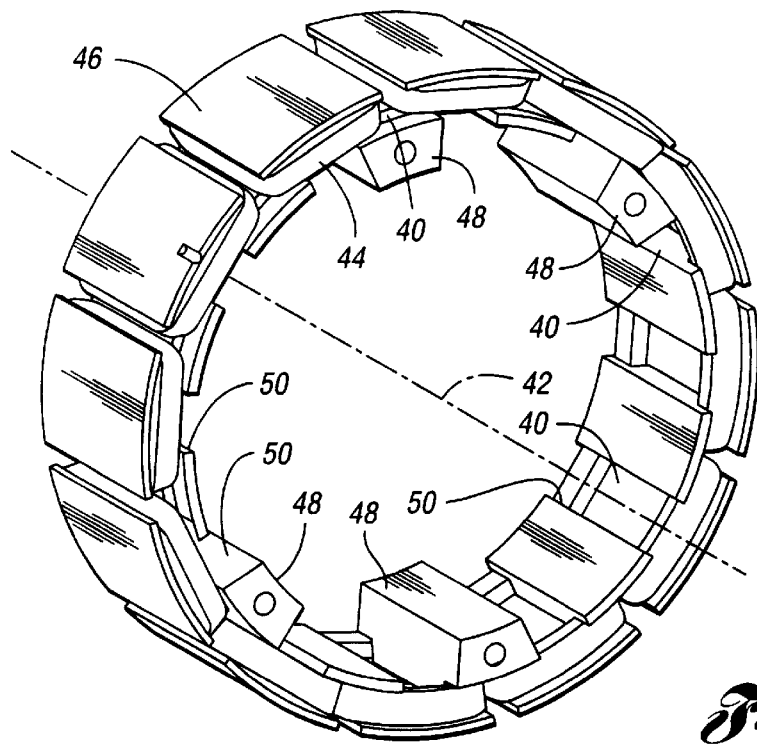
FIG. 3 is an isometric view of a stator used in the eddy current brake of the invention.

The stator of the retarder is shown in the isometric view of FIG. 3. It comprises stator pole pieces 40 mounted in a circular array about the central axis 42, which coincides with the axis of rotation of the rotor. The stator preferably is made of cast steel. The pole pieces and the body of the rotor itself define a contiguous annular piece. Electrical field windings 44 are positioned about each stator pole piece. The windings are part of a winding and bobbin assembly that will be described with reference to FIGS. 10 and 10a.

Secured to the radially outward face of each of the pole pieces is a pole cap 46, which is made of steel. The pole cap will be described with reference to FIGS. 8 and 8a.

At the radially inward margin of the stator, there are located multiple mounting bosses 48. These are located at multiple, peripherally spaced locations and form an integral part of the stator itself. The bosses 48 are part of an attachment that secures the stator to the differential and axle housing, as will be described with reference to FIGS. 5, 6 and 7.

Figure 4:
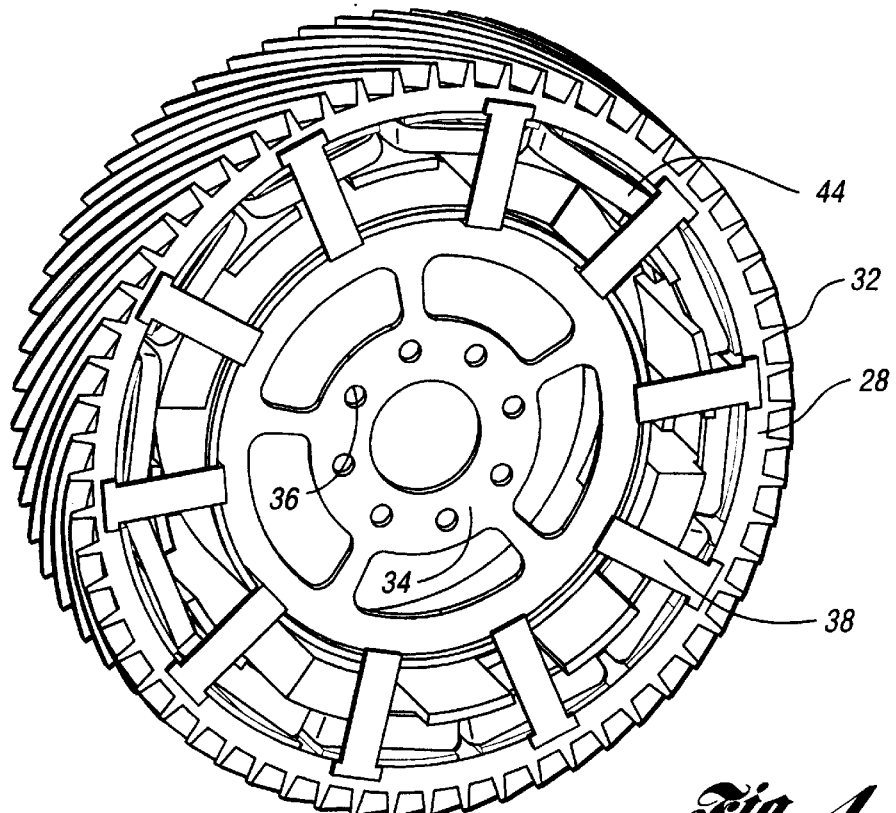
FIG. 4 is a partial assembly view of the stator and the rotor of FIGS. 2 and 3, but with the steel shield removed.

As seen in FIG. 3 and in FIG. 4, the stator is provided with hollowed regions or cavities 50 located at angularly spaced locations adjacent each stator pole. These hollowed regions or cavities reduce the total volume of the stator. Since the stator is formed preferably of low carbon steel, the weight of the stator is significantly reduced because of the presence of the cavities.

Figure 5:
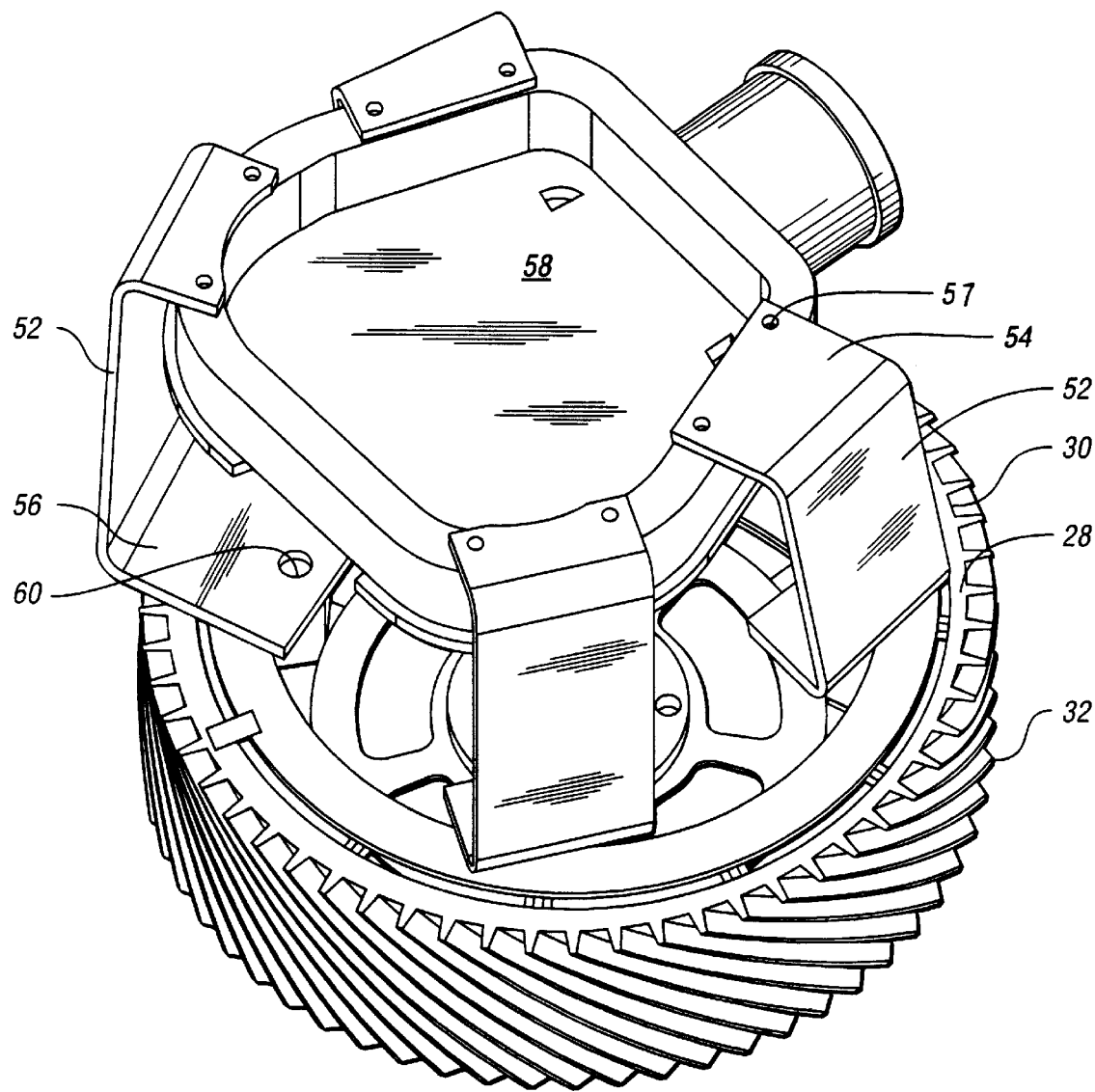
FIG. 5 is an isometric assembly view of the stator, the rotor, and the mounting brackets for securing the stator to the differential axle housing of the vehicle driveline.
Figures 11, 11A:
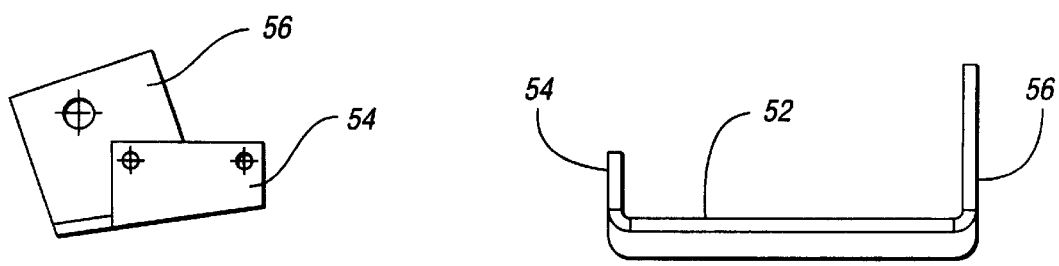
FIG. 11 is an end view of a mounting bracket for the stator.
FIG. 11a is a side view of the mounting bracket of FIG. 11.

The mounting brackets for securing the stator to the differential and axle housing are shown in FIGS. 5, 11 and 11a. As seen in FIG. 5, each bracket, seen at 52, has a first edge portion 54 and a second edge portion 56 arranged generally at right angles relative to the main body of the bracket 52. Edge portion 54 has mounting holes 57 for securing the bracket to the differential and axle housing, a portion of the housing being illustrated in FIG. 5 at 58.

Likewise, the end portion 56 has a bolt hole 60 for receiving a mounting bolt that extends through an opening in the mounting bosses 48 seen in FIG. 3. The bolt holes in the bosses 48 are shown in FIG. 7 at 62.

Figure 6:
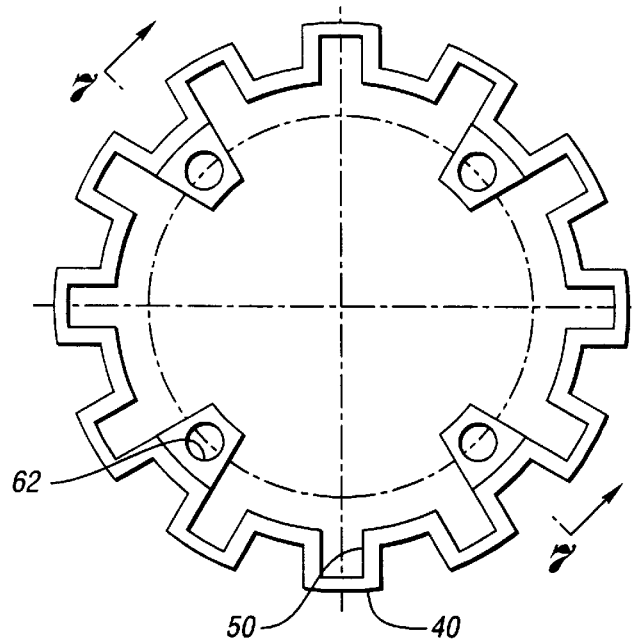
FIG. 6 is side view of the stator of the retarder of the invention.
Figure 7:
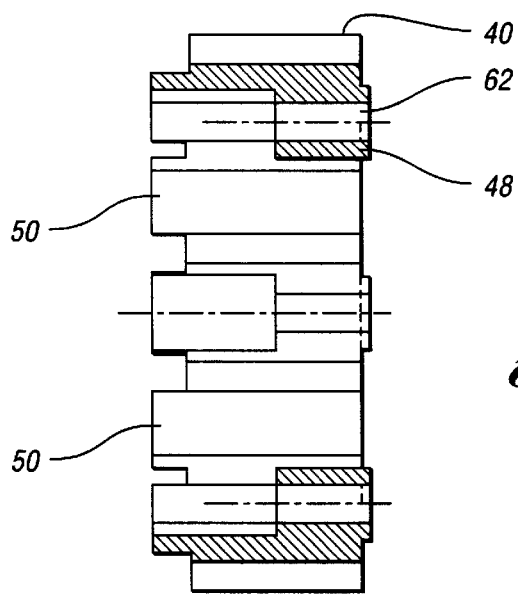
FIG. 7 is a cross-sectional view as seen from the plane of section line 7—7 of FIG. 6

As seen in FIGS. 6 and 7, the hollowed portions 50 of the stator are located under each pole 40. In this way, the total mass of the stator itself can be reduced by about 50%.

Figures 9, 9A:
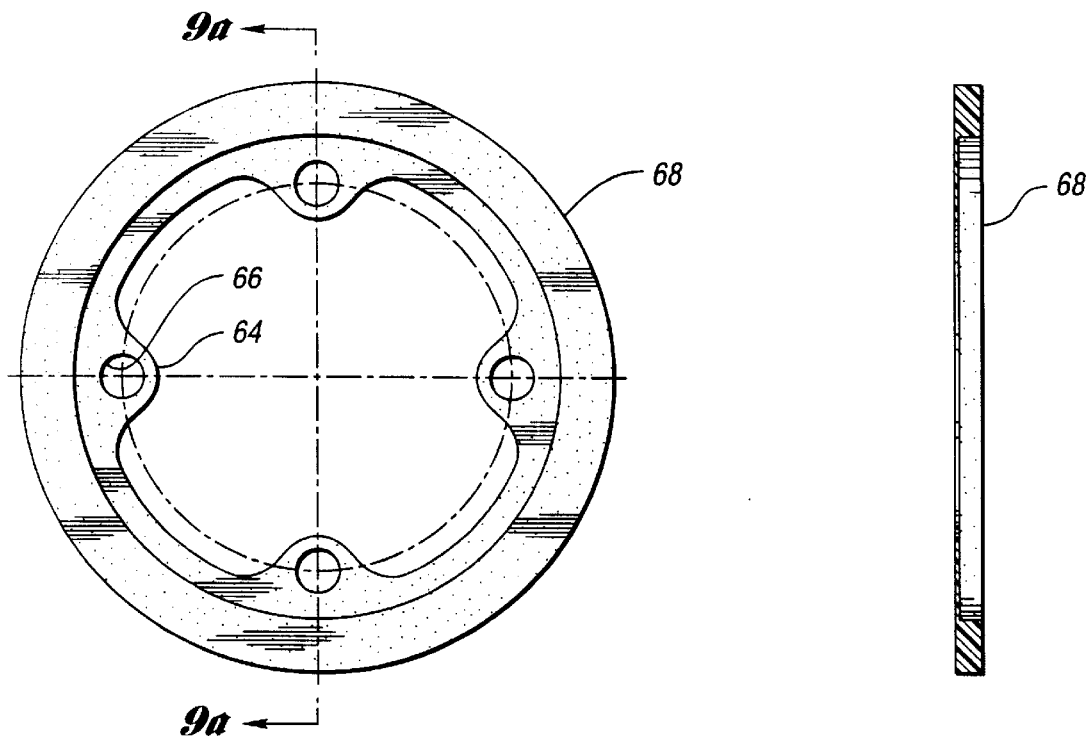
FIG. 9 is a plan view of a shield that covers the windings for the stator.
FIG. 9a is a cross-sectional view of the shield of the FIG. 9 as seen from the plane of section line 9a—9a of FIG. 9.

FIG. 9 and FIG. 9a show a steel plate shield that covers the windings 44. The shield is circular as shown and it includes radially inward mounting portions 64. The shield may be formed of plastic or metal (e.g., aluminum). The mounting portions 64 have openings 66 for receiving the mounting bolts that secure the stator to the differential and axle housing. The shield protects the windings and the stator against dirt and road debris in the environment.

The shield, which is identified at 68 in FIG. 9, is seen also in the cross-sectional view of FIG. 9a.

Figures 8, 8A:
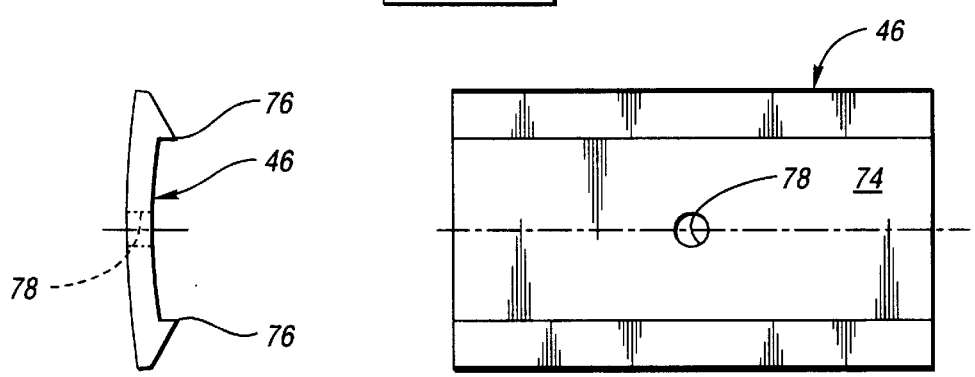
FIG. 8 is a radial view of a cap or a pole piece of the stator.
FIG. 8a is an end view of the cap of FIG. 8.
Figures 10, 10A:
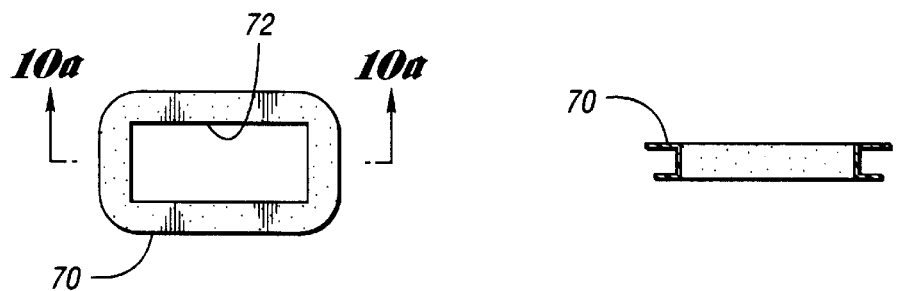
FIG. 10 is a plan view of a field winding bobbin assembly for the pole pieces of the stator.
FIG. 10a is an edge end view of the assembly of FIG. 10.

Each of the windings for the stator poles is comprised of a bobbin and winding assembly, seen in FIGS. 10 and 10a. The winding and bobbin assembly has a generally rectangular bobbin 70, preferably made of plastic, about which copper windings are wound prior to assembly in the retarder. The bobbin has a central opening 72 that is sized so that it can be mounted directly over the radially extending pole pieces 40 of the stator. After a bobbin and winding assembly is received over each pole piece, a steel cap 46, seen in FIGS. 8 and 8a, is secured to the outer face of each pole piece. The cap 46 comprises a generally rectangular steel body portion 74 and edge portion 76, which overlie the edges of the pole pieces. The body portion 74 has a bolt opening 78, which receives a through-bolt (not seen) to secure the individual pole caps to their respective pole pieces. They also secure in place the winding and bobbin assembly for the pole pieces.

Figure 13A:
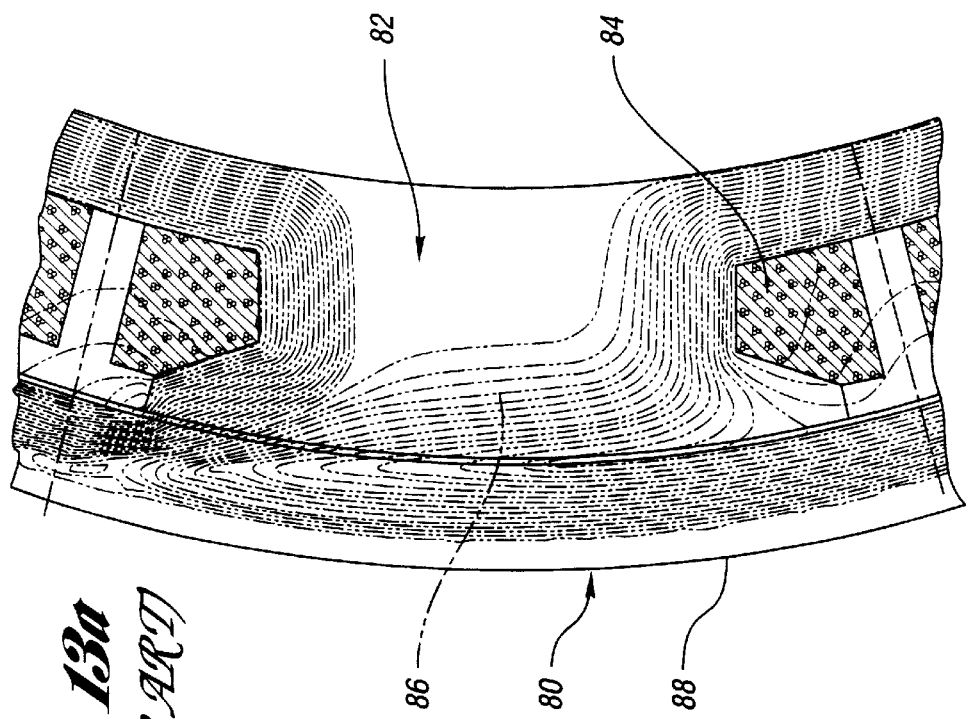
FIG. 13a is a schematic view similar to FIG. 13 but which shows a prior art construction for the stator pole and the magnetic flux flow path associated with the prior art construction.

In FIG. 13a, a prior art stator and rotor assembly is shown at 80. The stator, as seen at 82, is of solid construction. The windings 84 surround the pole pieces 82. When the windings are subjected to an excitation current, lines of flux are generated along a flux flow circuit 86. The pattern of the flux flow circuit is primarily at the outer regions of the pole pieces and are offset from the central axis of the pole pieces as indicated. The lines of flux travel through the flux flow circuit include the path through the surrounding rotor drum, as seen at 88. The lines of flux are concentrated principally at the inner surface of the drum 88 and form a continuation of a flux flow circuit as the rotor rotates relative to the stator.

Figure 13:
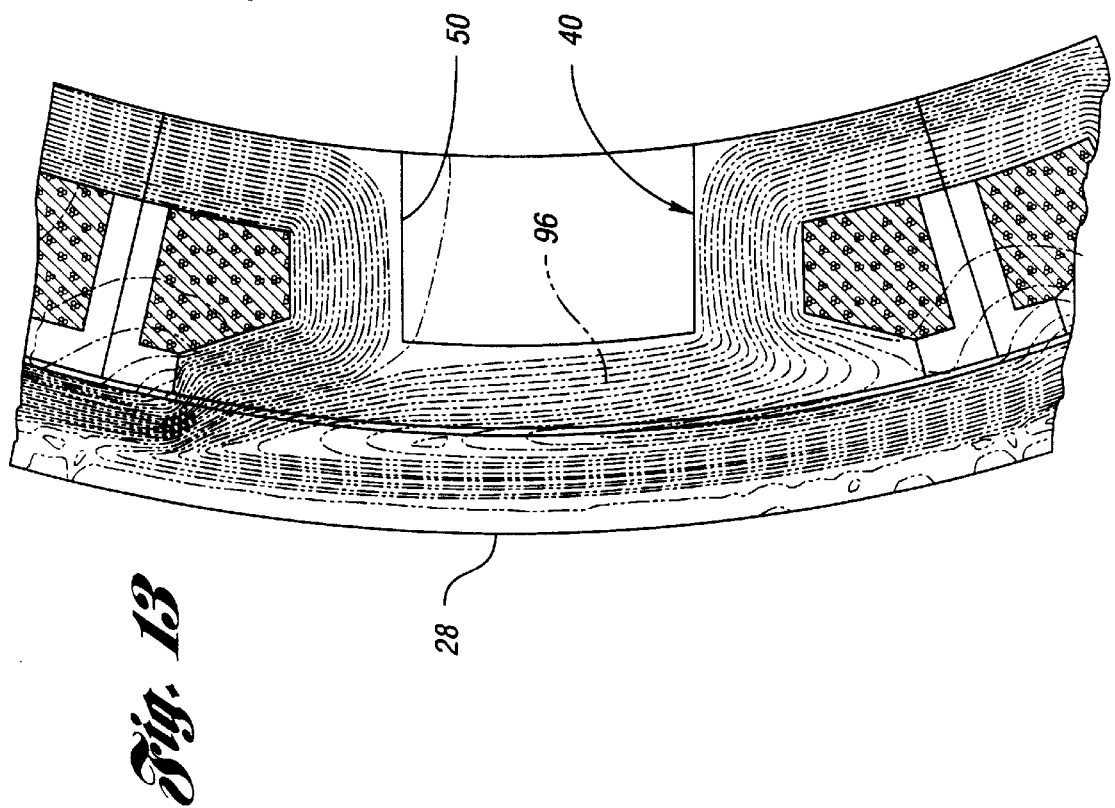
FIG. 13 is a schematic representation of a peripheral portion of a stator pole and the surrounding rotor indicating the magnetic flux flow paths and the electrical windings for the stator poles.

The prior art construction of FIG. 13a is in sharp contrast to the stator construction of the invention illustrated schematically in FIG. 13. The pole piece 40 of the invention has hollow portions 50, as indicated previously. The hollow portions 50 are located generally in the region of the pole pieces that do not contain a significant part of the flux flow circuit or path indicated at 96 in the FIG. 13 construction. The flux flow path seen at 96 in FIG. 13 is generally similar to the flux flow path 86 of the prior art construction of FIG. 13a. Thus, the absence of metal at the core of the pole pieces has insignificant effect on the flux flow pattern.

As in the case of the prior art construction of FIG. 13a, the flux flow circuit, as seen in FIG. 13, includes the flux flow path in the rotor 28. To illustrate the insignificant effect of using a hollow pole piece rather than a solid pole piece, the braking torque at various rotor speeds for the retarder of the present invention is illustrated in the following table:

| Rotor Speed | Torque With Solid Pole | Torque With Hollowed Pole |
|---|---|---|
| 3000 RPM | 563.5 Nm | 561 Nm |
| 2600 RPM | 591 Nm | 588 Nm |
| 800 RPM | 756 Nm | 750 Nm |

The left column of the table represents the rotor speed, the middle column represents the braking torque in Newton-meters using solid pole pieces, and the right column indicates the braking torque for the retarder of the present invention.

Figure 14:
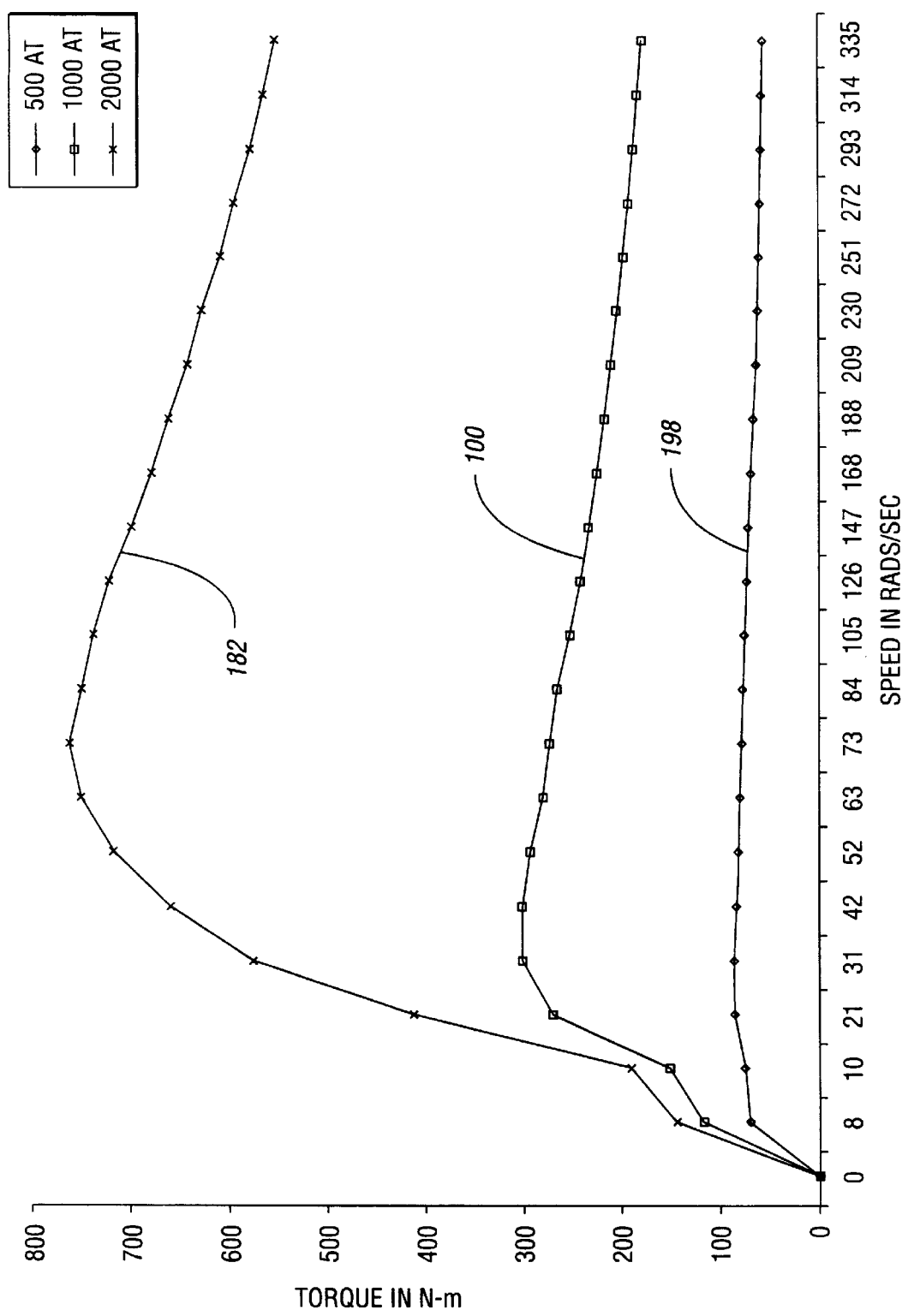
FIG. 14 is a plot of the retarder brake operating characteristics showing the braking torque for various rotor speeds and for various ampere-turns for the stator.

The ordinate of the plot of FIG. 14 represents the braking torque in Newton-meters and the abscissa represents the rotor speed in radians per second. The three plots of FIG. 14 represent the braking torque with various ampere-turns for the pole pieces. The plot shown at 198 represents braking torque when the stator windings have 500 ampere-turns. Plot 100 shows the braking torque with 1000 ampere-turns. Plot 102 shows the braking torque with 2000 ampere-turns. The ampere-turns for any given application are chosen so that the braking torque will be at a maximum for any given rotor speed.

Although a preferred embodiment of the invention has been disclosed, it will be apparent to persons skilled in the art that modifications to the invention may be made without departing from the scope of the invention. All such modifications and equivalents thereof are to be included within the scope of the following claims.

What is claimed is:

1. A retarder brake for a rotary member comprising a stator and a rotor to effect braking torque, the rotor being mounted for rotation relative to the stator about a rotary axis;

the stator having stator poles arranged at angular positions about the rotary axis, each stator pole including a face disposed in close proximity to the rotor with an air gap therebetween;

electrical stator windings surrounding each pole, the windings establishing a magnetic flux field when they are energized;

the stator poles extending radially relative to the rotary axis, each having a central opening to define a hollow core that substantially reduces the mass of the stator, the magnetic flux field being characterized by flux flow paths crossing the air gaps and intersecting the rotor, thereby creating eddy currents in the rotor when the rotor rotates relative to the stator as kinetic energy of the rotor is converted into thermal energy, the flux flow path being offset radially relative to the rotary axis from the central openings in the rotor poles whereby the flux density in the radially outward region of the rotor and in the region of the air gap between the stator poles and the rotor is increased while the braking torque is not significantly affected notwithstanding the reduced mass of the stator.

2. An electromagnetic retarder brake for a wheeled vehicle having friction wheel brakes, a vehicle drive shaft, wheel axle shafts and a differential gearing assembly drivably connecting the drive shaft and the wheel axles;

a stator for the retarder brake being secured to a stationary portion of the differential gearing assembly to effect braking torque;

a rotor drum drivably connected to the drive shaft and mounted for rotation about a rotor axis, the stator having stator poles arranged at angularly spaced positions about the rotor axis;

each stator pole including a face disposed in close proximity to the rotor drum with an air gap therebetween;

electrical stator windings surrounding each pole, the windings establishing a magnetic flux field when they are energized;

the stator poles extending radially relative to the rotary axis, each having a central opening to define a hollow core that substantially reduces the mass of the stator, the magnetic flux field being characterized by flux flow paths crossing the air gap and intersecting the rotor drum thereby creating eddy currents on the periphery of the rotor drum when the rotor rotates relative to the stator as kinetic energy of the rotor drum is converted into thermal energy;

the flux flow paths being offset radially relative to the rotary axis from the central openings in the rotor poles whereby the braking capacity of the retarder brake is not significantly reduced by the presence of the stator pole openings and the accompanying reduced mass of the stator;

flux density in the radially outward region of the rotor and in the region of the air gap between the stator poles and the rotor being increased while the braking torque is not significantly affected notwithstanding the reduced mass of the stator due to the hollow stator cores.

3. The retarder brake as set forth in claim 1 wherein the rotor is mounted for rotation about the stator poles; and cooling fins on the rotor, the cooling fins increasing the effective area of the rotor to effect increased thermal energy dissipation.

4. The retarder brake as set forth in claim 2 wherein the rotor drum is mounted for rotation about the stator poles; and cooling fins on the rotor drum, the cooling fins increasing the effective area of the rotor drum to effect increased thermal energy dissipation.

5. The retarder brake as set forth in claim 1 wherein the rotor comprises a drum with an inner, circular drum surface, the stator being mounted within the drum and having an external pole face on each pole, the air gap separating the pole faces and the inner circular drum surface.

6. The retarder brake as set forth in claim 1 comprising a steel shield plate secured to the rotor adjacent the stator windings whereby the windings are protected from a harsh environment, the shield establishing a flux flow path for flux leakage across the air gap.

7. The retarder brake as set forth in claim 1 wherein the stator windings are prefabricated in the form of bobbins, one bobbin being positioned over each stator pole during assembly of the retarder brake; and a metallic pole cap secured to each stator pole, the stator caps thereby effectively forming a portion of the stator poles, each pole cap defining a pole face whereby the available effective area of the flux flow path across the air gap is increased.

8. The retarder brake as set forth in claim 2 wherein the stator windings are prefabricated in the form of bobbins, one bobbin being positioned over each stator pole during assembly of the retarder brake; and a metallic pole cap secured to each stator pole, the stator caps thereby effectively forming a portion of the stator poles, each pole cap defining a pole face whereby the available effective area of the flux flow path across the air gap is increased.

9. The retarder brake as set forth in claim 7 wherein the pole caps are secured to the stator poles adjacent the pole winding bobbins thereby retaining the windings in place following assembly of the retarder brake.

10. The retarder brake as set forth in claim 9 wherein the stator windings are prefabricated in the form of bobbins, one bobbin being positioned over each stator pole during assembly of the retarder brake; and a metallic pole cap secured to each stator pole, the stator caps thereby effectively forming a portion of the stator poles, each pole cap defining a pole face whereby the available effective area of the flux flow path across the air gap is increased.

* * * * *